F. A. G. PAPE.
METHOD AND MACHINE FOR CRACKING NUTS.
APPLICATION FILED NOV. 22, 1919.

1,342,691.

Patented June 8, 1920.
2 SHEETS—SHEET 1.

Frederic A. G. Pape, Inventor
By his Attorneys
Pennie Davis Marvin & Edmonds

F. A. G. PAPE.
METHOD AND MACHINE FOR CRACKING NUTS.
APPLICATION FILED NOV. 22, 1919.
1,342,691.
Patented June 8, 1920.
2 SHEETS—SHEET 2.
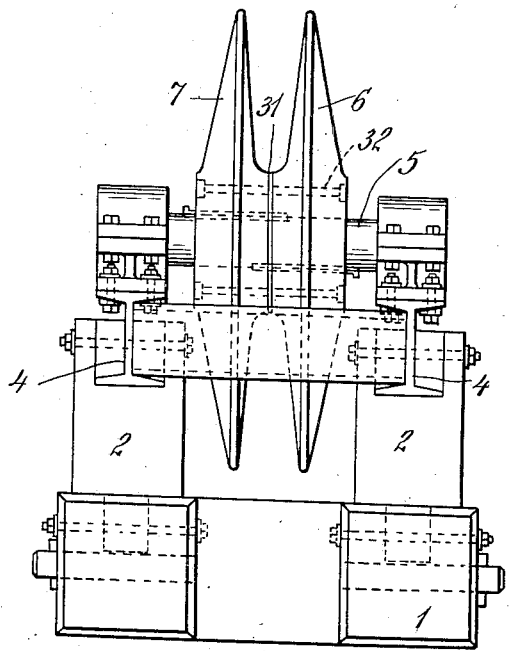
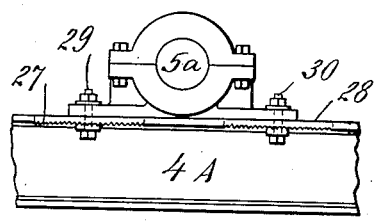
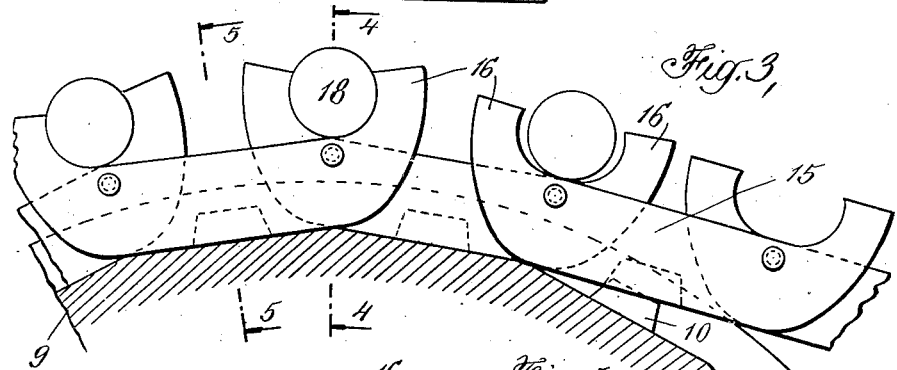
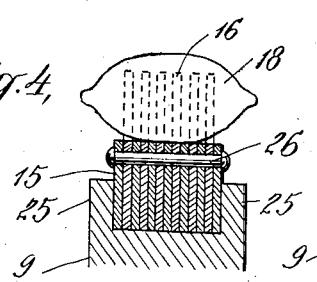
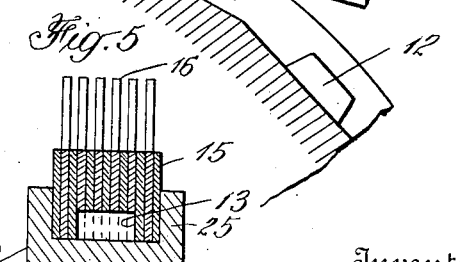

UNITED STATES PATENT OFFICE.

FREDERIC A. G. PAPE, OF NEW YORK, N. Y., ASSIGNOR TO LYMAN N. HINE, OF NEW YORK, N. Y.

METHOD AND MACHINE FOR CRACKING NUTS.

1,342,691.        Specification of Letters Patent.        Patented June 8, 1920.

Application filed November 22, 1919. Serial No. 339,878.

*To all whom it may concern:*

Be it known that I, FREDERIC A. G. PAPE, a citizen of Germany, residing at New York, in the county of New York, State of New York, have invented certain new and useful Improvements in Methods and Machines for Cracking Nuts; and I do hereby declare the following to be a full, clear, and exact description of the invention, such as will enable others skilled in the art to which it appertains to make and use the same.

This invention relates to an improved method and machine for cracking nuts, and more particularly for cracking cohune nuts and like palm nuts having a thick, hard, stone-like shell. The present invention provides an improved apparatus which is simple in construction, automatic and continuous in operation, and adapted to crack the nuts with a minimum of injury to the nut kernel. The present invention also provides an improved process of cracking the nuts according to which the nuts are gripped and held firmly on their sides and forced between tapered crushing members or disks which act upon the ends of the laterally held nuts and effectively crack them.

The nuts of the *Attalea* and other species of palm trees of the Central and South American tropics are provided with two shells. The outer shell is a pericarp or husk of a fibrous nature and of varying density, and it is impregnated with woody pulp and resinous matter. It varies in thickness up to about one-quarter inch. The inner shell is more than double the thickness of the outer shell, and is of a most obstinate hardness, and somewhat like stone.

The cohune nuts grow by the hundreds in clusters upon a common stalk. An average cluster or bunch may thus weigh more than a hundred pounds, and may be from two and a half to three and a half feet in length; and frequently contains more than five hundred nuts. The nuts vary somewhat in size, but are comparable in size and shape with a duck's egg, although they run out to a fibrous point at the small end. The cohune nuts do not all ripen at the same time, but progressively ripen, both while upon the stalk and after removal therefrom.

The kernels of the cohune nuts are heavily charged with oil and this oil is valuable for edible and other purposes, somewhat resembling coconut oil in odor and flavor. The kernels form about one-tenth of the weight of the cohune nuts; that is, from about ten tons of nuts there should be obtained about one ton of kernels. When the nuts are ripe the kernels are loose and are readily removed when the outer shells of the nuts are cracked or otherwise opened. The nature of the shells is, however, such that the cracking operation is difficult, and particularly where the meats or kernels are desired in an uninjured or unbroken condition after the cracking operation. Where the kernels are injured or broken during the cracking operation, they more readily spoil during shipment, and it is more difficult to recover all of the kernel from the shell.

The present invention relates to an improved method and machine by which such nuts can be cracked rapidly and in a continuous and automatic manner. The invention is applicable to nuts of varying sizes and shapes, and to nuts which have been freed from their outer shell or pericarp as well as to nuts which have not been so freed. Preferably, however, the nuts are first subjected to a special treatment for the removal of the outer shell or husk from the hard inner shell so that the clean nuts are subjected to the cracking operation. An improved method and apparatus for effecting this preliminary removal of the outer husk or shell, so that the nuts may be made available in a clean state for the cracking operation, is described in my companion application Serial No. 304,025, filed June 13, 1919.

The improved machine of the present invention comprises generally a nut-gripping feed chain carried by suitable sprockets and adapted to seize and grip the nuts laterally and hold them during the cracking operation; together with crushing disks between which the nuts are forced by the feed chain and between which the nuts are subjected to lateral compression on their ends, whereby the nut shells are broken and the meats released. The feed chain is made up of links which are adapted to open to receive the nuts and then to close to hold the nuts while they are subjected to the cracking action of the cracking disks. This is effected by causing the chain to pass over sprocket wheels in such a way that the links of the chain are open to receive the nuts when the sprocket chain is straight and to close to retain the nuts when the sprocket chain passes over the sprocket. The cracking disks have an endwise crushing action upon the nuts. They are bevel disks, spaced apart a greater distance at their outer edges than at their centers and tapered to provide a gradually decreasing groove or slot into which the nuts are forced by the feed chain. These crushing disks may be spaced apart at different distances to enable them to act upon nuts of different sizes. So also, their surfaces may be either smooth or radially corrugated or otherwise constructed to promote the crushing action. The invention will be further described in connection with the accompanying drawings illustrative of one embodiment of the apparatus in which the process can be practised. In the accompanying drawings Figure 1 shows, in a somewhat diagrammatic and conventional manner, the apparatus in side elevation;

Fig. 2 is a left-hand end view of part of the apparatus;

Fig. 3 is an enlarged detail of a portion of the chain and sprocket wheel;

Figure 1:
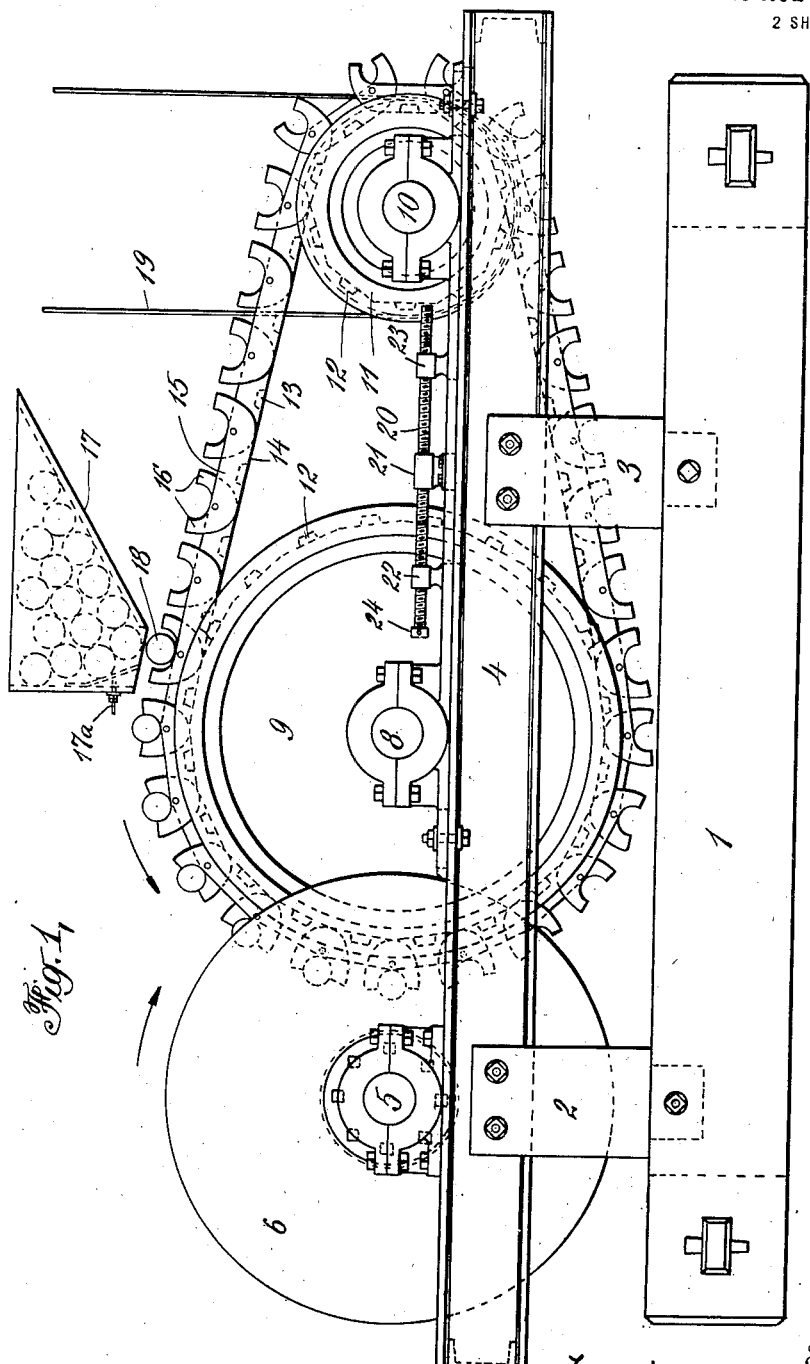

Figs. 4 and 5 are sectional views taken respectively on the lines 4—4 and 5—5 of Fig. 3; and Fig. 6 is a detail view showing a modification.

The machine illustrated is made up of the lower frame members 1 suitably joined together and made of wood or other suitable material. Supported by these members are upright members 2 and 3 carrying the upper I-beams 4 of the frame. Mounted upon these upper frame members are three bearings carrying the shafts 5, 8 and 10. Mounted upon the shaft 5 are the crushing disks 6 and 7 while mounted upon the shaft 8 is the sprocket wheel 9 and upon the shaft 10 is the small sprocket wheel or pinion 11. The sprocket wheels 9 and 11 have sprockets 12 which engage recesses 13 in the nut gripping feed chain 14. This feed chain is made up of a series of link members 15 having upwardly projecting ends 16 adapted to receive between them and grip the nuts 18 which are fed from a suitable feed hopper 17. The power is applied in any suitable manner as by means of a belt 19 acting upon a pulley secured to the shaft 10.

The crushing disks 6 and 7 may be spaced apart at different distances by inserting one or more washers 31 therebetween and these disks are secured to each other by means of bolts 32 and both disks are keyed or otherwise secured upon the shaft 5.

In order to enable the nuts, carried by the feed chain 14, to be introduced a greater or less distance into the space between the crushing disks, the sprocket wheels carrying the chain are adjustable toward or away from the crushing disks. In Fig. 1 this adjustment is secured by making the bearing of the shafts 8 and 10 longitudinally movable upon a support, and by effecting the movement of these shafts by means of an adjusting screw 20 having operating handle 24 and acting in arms or projections 21, 22 and 23. The operation of this screw is such that, by rotating the screw, both the sprocket wheels 9 and 11 with their bearings are moved simultaneously and to the same distance either toward or away from the crushing disks 6 and 7.

In the modification of Fig. 6, the bearings of the shafts are intended to be adjusted without the use of an adjusting screw, for example, by jacking up the bearings and then moving them along their support to the desired extent. In Fig. 6 the bearings of the shaft 5ª have clamping bolts 29 and 30 acting in slots 27 and 28. The lower surfaces of the members having these slots is corrugated as shown, and is adapted to be engaged by complementary corrugated surfaces of the nuts carried by the clamping bolts. The arrangement is such that the bearings are properly guided by the slots during their adjustment, and also such that the bearings can be firmly clamped in place after adjustment.

A preferred construction of the nut gripping feed chain is shown in Figs. 3, 4 and 5 from which it will be seen that the chain is made up of link members 15 having projections 16 at their ends and pivoted together by means of bolts 26 near their ends. The middle links are cut away to provide the recesses 13 for the sprockets 12 while the sprocket wheels have flanges 25 which aid in guiding and holding the chain.

In the operation of the apparatus and the practice of the nut cracking process the nuts are supplied to the hopper 17 and are constantly agitated therein by means of an oscillatory agitating device 17ª. This hopper is provided with an oval mouth or opening arranged directly over the center of the nut gripping chain so that the nuts are permitted to drcp into the openings between the chain links as the chain passes under this opening. The chain is caused to move at a calculated speed and the nuts drop automatically into the openings or jaws of the chain as it moves forward, this action being continuous and automatic. Furthermore, it will be seen that the shape and arrangement of the hopper discharge opening is such that the nuts are arranged crosswise of the chain so that they are gripped laterally by the jaws of the chain.

It will further be seen that the jaws of the chain are open when the chain is straight and that the nuts drop into the jaws while in their open position. As the chain moves over the sprocket wheel and is bent in conformity with the curvature of the wheel the jaws of the chain close and grip the nuts firmly holding them as they are carried down between the cracking disks.

The nuts thus held by the jaws of the feed chain are carried between the crushing members which are, as above explained, preferably two metal disks having their interior surfaces beveled off to permit of the free entry between them of the feed chain carrying the nuts. The feed chain is so spaced with reference to the crushing disks that the nuts are conveyed into the tapered space between the disks to the extent necessary for crushing them. Owing to the taper of the disks the nuts will be squeezed endwise as they are forced inward and downward until finally they are subjected to sufficient endwise crushing force to break them, after which the nuts or the broken portions of the shell and the nut meats are automatically released and fall downward into a receptacle therefor (not shown). The cracked nuts are then subjected to a separating or winnowing operation for recovering the meats from the broken pieces of shell.

The apparatus adapts itself for crushing larger or smaller sized nuts by adjusting the space between the crushing disks, as by the addition or removal of one or more of the intermediate washers 31 or by moving the sprocket wheels and nut carrying chain toward or away from the crushing disks, thereby increasing or decreasing the extent to which the nuts are forced between the disks and the crushing action to which they are subjected. It will further be seen that the pressure exerted by the nuts is a combined lateral and end pressure due to the combined action of the jaws of the chain links which grip the nuts firmly and subject them to a considerable pressure, and the endwise crushing action of the bevel disks. As a result, the nuts are automatically and continuously forced open, in a constant and automatic manner, so long as the feed of the nuts is continued and the machine operated.

The apparatus as a whole is self contained and smoothly working and can be readily transported from one place to another. It is also of simple and rugged construction and can be operated without the attention of an expert. The apparatus can be readily mounted upon a truck or car for transportation or for use, and it may be driven by power derived from any suitable source.

The cracking operation or process which is carried out in the improved cracking machine comprises, as above pointed out, the feeding of the nuts between the jaws of the nut gripping feed chain where they are laterally gripped and held firmly and subjected to a lateral compression and crushing action and are then carried between the tapered or beveled surfaces of the crushing disks, where they are subjected to a gradually increasing end pressure until the cracking is effected, after which the nuts are automatically discharged. The process of the present invention enables palm nuts to be easily and continuously cracked in large amount so that there is obtained therefrom the palm kernels containing the valuable oil; and these kernels are moreover obtained without objectionable injury thereto so that they are well adapted for subsequent treatment for the recovery of oil therefrom.

It will be evident that variations and modifications may be made in the specific construction of the apparatus illustrated and described without departing from the spirit and scope of the invention.

I claim:

1. The method of cracking palm nuts and the like, which comprises feeding the nuts between jaws adapted to grip them, and feeding the nuts while so gripped between tapered crushing disks or surfaces adapted to subject the nuts to a sufficient pressure to effect the crushing or breaking thereof.

2. The method of cracking palm nuts and the like, which comprises gripping the nuts laterally and forcing the thus gripped nuts between tapered crushing surfaces and thereby subjecting the nuts to progressively increasing endwise compression until crushing or breaking thereof takes place.

3. A nut cracking machine for cracking palm nuts and the like, comprising crushing disks or surfaces having openings of gradually decreasing width therebetween, and means for positively forcing the nuts between such surfaces whereby they are subjected to increasing pressure to effect cracking thereof.

4. A nut cracking machine for cracking palm nuts and the like, comprising two crushing disks having openings therebetween of gradually decreasing width, a sprocket chain having nut gripping jaws adapted to open to receive the nuts and to close to grip the nuts firmly, means for feeding the nuts into such jaws while in an open position, and means for conveying the nuts while so gripped into the space between the crushing disks to subject them to increasing pressure until the cracking is effected.

5. A nut cracking machine for cracking palm nuts and the like, comprising cracking disks or surfaces having a gradually decreasing opening therebetween, a sprocket chain, sprocket wheels for carrying said chain and arranged to bring it into the space between said disks, said chain being constructed of link members adapted to open to receive the nuts to be cracked and to close to grip the nuts while being cracked, and means for feeding the nuts to the nut-gripping chain, whereby the nuts are gripped thereby and carried between the crushing disks and there crushed.

6. A nut cracking machine for cracking palm nuts and the like, comprising crushing disks or surfaces having an opening of gradually decreasing width therebetween, a sprocket wheel carrying a sprocket chain, a second sprocket wheel over which the chain passes, said chain being constructed to grip and hold the nuts to be cracked and to carry the same between the crushing disks, and said sprocket wheels and chain being adjustable toward and from said crushing members.

7. A nut cracking machine for cracking palm nuts and the like, comprising crushing disks or surfaces having an opening therebetween of gradually decreasing width, a nut-gripping feed chain for conveying the nuts into the space between said cracking surfaces and there subjecting them to progressively increasing pressure to effect the breaking thereof, means for supporting and conveying said chain, and means for adjusting said chain and support toward and from the cracking surfaces to increase or decrease the cracking pressure.

8. A nut cracking machine for cracking palm nuts and the like, comprising two coaxially mounted crushing disks having openings of progressively decreasing width therebetween, means for varying the distance between said disks, and means for positively feeding the nuts between such surfaces, whereby they are subjected to increasing pressure to effect cracking thereof.

9. A nut cracking machine for cracking palm nuts and the like, comprising crushing disks or surfaces having openings of progressively decreasing width therebetween, and a nut-gripping sprocket chain arranged to grip the nuts and force them between such surfaces to crack them, said chain being mounted upon sprockets and being made up of a series of links pivotally joined together and having upwardly extending end portions between which the nuts are adapted to be gripped.

In testimony whereof I affix my signature.

FREDERIC A. G. PAPE.